US012769045B2

(12) United States Patent
Lin et al.

(10) Patent No.: US 12,769,045 B2
(45) Date of Patent: Oct. 20, 2026

(54) LIGHT GUIDE PLATE AND LIGHT SOURCE MODULE

(71) Applicant: Coretronic Corporation, Hsin-Chu (TW)

(72) Inventors: Tzu-Hung Lin, Hsin-Chu (TW); Chung-Yang Fang, Hsin-Chu (TW); Ping-Yen Chen, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/235,587

(22) Filed: Jun. 12, 2025

(65) Prior Publication Data

US 2026/0003116 A1 Jan. 1, 2026

(30) Foreign Application Priority Data

Jun. 28, 2024 (CN) ........................ 202410855059.2

(51) Int. Cl.
*F21V 8/00* (2006.01)

(52) U.S. Cl.
CPC ......... *G02B 6/0031* (2013.01); *G02B 6/0016* (2013.01)

(58) Field of Classification Search
CPC .. G02B 6/0033; G02B 6/0035; G02B 6/0036; G02B 6/0038; G02B 6/04; G02B 6/0043
See application file for complete search history.

(56) References Cited

U.S. PATENT DOCUMENTS 7,133,092 B2 * 11/2006 Lee ...................... G02B 6/0038 349/112
7,927,003 B2 * 4/2011 Chang .................. G02B 6/0055 362/624
11,940,645 B2 * 3/2024 Wang .................. G02B 6/0038
(Continued)

FOREIGN PATENT DOCUMENTS

CN 101630067 1/2010
CN 103149623 6/2013
(Continued)

OTHER PUBLICATIONS

"Office Action of Taiwan Counterpart Application", issued on Jul. 31, 2025, p. 1-p. 13.

*Primary Examiner* — Matthew J. Peerce
(74) *Attorney, Agent, or Firm* — JCIPRNET

(57) ABSTRACT

A light guide plate includes a plurality of optical microstructures. The plurality of optical microstructures are disposed on a first surface of the light guide plate. An absorption layer including a plurality of first absorption units and a reflection layer including a plurality of reflection units are also provided on the light guide plate. The reflection units respectively overlap the optical microstructures. The first absorption units respectively overlap at least a part of the reflection units. The at least a part of the reflection units are located between the corresponding first absorption units and the optical microstructures. The light guide plate of the disclosure has less light leakage on a non-light emitting surface side. A light source module with the light guide plate is also proposed. The light source module of the disclosure has better light energy utilization rate and is adapted for full lamination with other functional modules.

13 Claims, 13 Drawing Sheets

(56) References Cited

U.S. PATENT DOCUMENTS

| | | | | |
|---|---|---|---|---|
| 2014/0146563 | A1* | 5/2014 | Watanabe | G02B 6/0043 362/606 |
| 2016/0299277 | A1 | 10/2016 | Wang | |
| 2020/0257034 | A1* | 8/2020 | Masuda | G02B 27/0101 |

FOREIGN PATENT DOCUMENTS

| | | | |
|---|---|---|---|
| CN | 217932158 | | 11/2022 |
| CN | 217932158 U | * | 11/2022 |
| TW | 201323949 | | 6/2013 |

* cited by examiner

LIGHT GUIDE PLATE AND LIGHT SOURCE MODULE

CROSS-REFERENCE TO RELATED APPLICATION

This application claims the priority benefit of China application serial no. 202410855059.2, filed on Jun. 28, 2024. The entirety of the above-mentioned patent application is hereby incorporated by reference herein and made a part of this specification.

BACKGROUND

Technical Field

The disclosure relates to an optical element and an optical module, and particularly relates to a light guide plate and a light source module.

Description of Related Art

Most of the current light guide plates use the interface between the optical microstructure and the air layer to perform total reflection to the light and guide the light to the light-emitting surface. In order to maintain the aforementioned light guide function, a side of the light guide plate provided with the optical microstructure cannot be fully laminated with a functional module (such as a glass cover, a touch module, or other functional modules). However, the existence of the air layer between the light guide plate and the functional module easily causes the ambient light to generate an interface reflection between the light guide plate and the functional module, which affects the visual effect, and the air layer causes the display device to have insufficient structural strength, making it less resistant to the environment. In addition, a part of the light transmitted in the light guide plate will be refracted by the optical microstructure and then emitted to form light leakage, resulting in a decrease in the image contrast of the display image displayed by the display device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

An embodiment of the disclosure provides a light guide plate. The light guide plate includes a plurality of optical microstructures. The plurality of optical microstructures are disposed on a first surface of the light guide plate. An absorption layer and a reflection layer are also provided on the light guide plate. The reflection layer includes a plurality of reflection units. The reflection units respectively overlap the plurality of optical microstructures. The absorption layer includes a plurality of first absorption units. The first absorption units respectively overlap at least a part of the reflection units. The at least a part of the reflection units are located between the corresponding first absorption units and the plurality of optical microstructures.

In order to achieve one or a portion of or all of the objects or other objects, an embodiment of the disclosure provides a light source module. The light source module includes a light guide plate, an absorption layer, a reflection layer, and a light source. The light guide plate includes a plurality of optical microstructures. The plurality of optical microstructures are disposed on a first surface of the light guide plate. The reflection layer includes a plurality of reflection units. The reflection units respectively overlap the plurality of optical microstructures. The absorption layer includes a plurality of first absorption units. The first absorption units respectively overlap at least a part of the reflection units. The reflection units respectively overlap the optical microstructures. The at least a part of the reflection units are located between the corresponding first absorption units and the plurality of optical microstructures. The light source is disposed on a side of a light incident surface of the light guide plate. The light incident surface is connected to the first surface.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The disclosure provides a light guide plate with less light leakage on a non-light emitting surface side.

The disclosure provides a light source module that has better light energy utilization rate and is adapted for full lamination with other functional modules.

Figure 1:
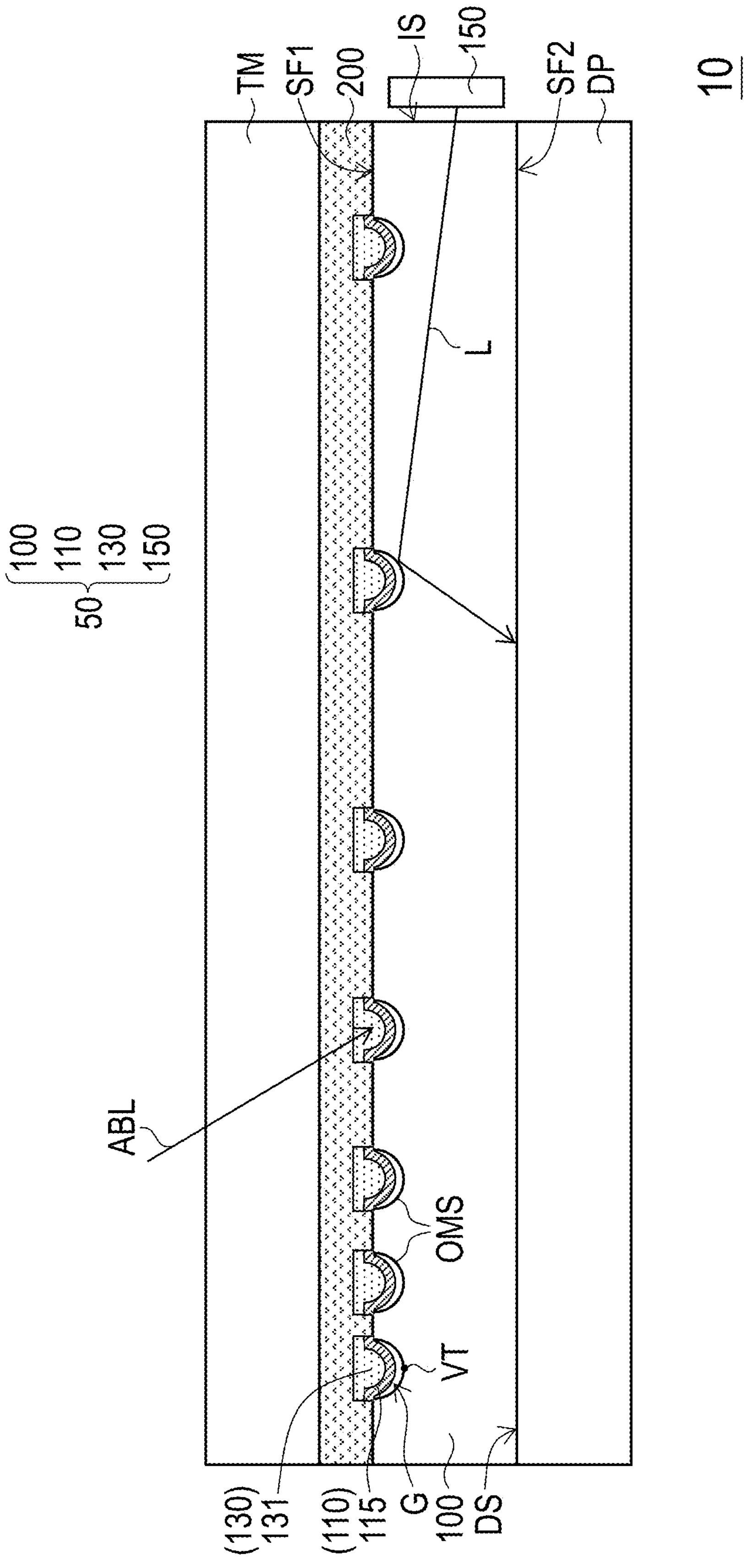
FIG. 1 is a schematic cross-sectional view of a display device according to a first embodiment of the disclosure.
Figure 2:
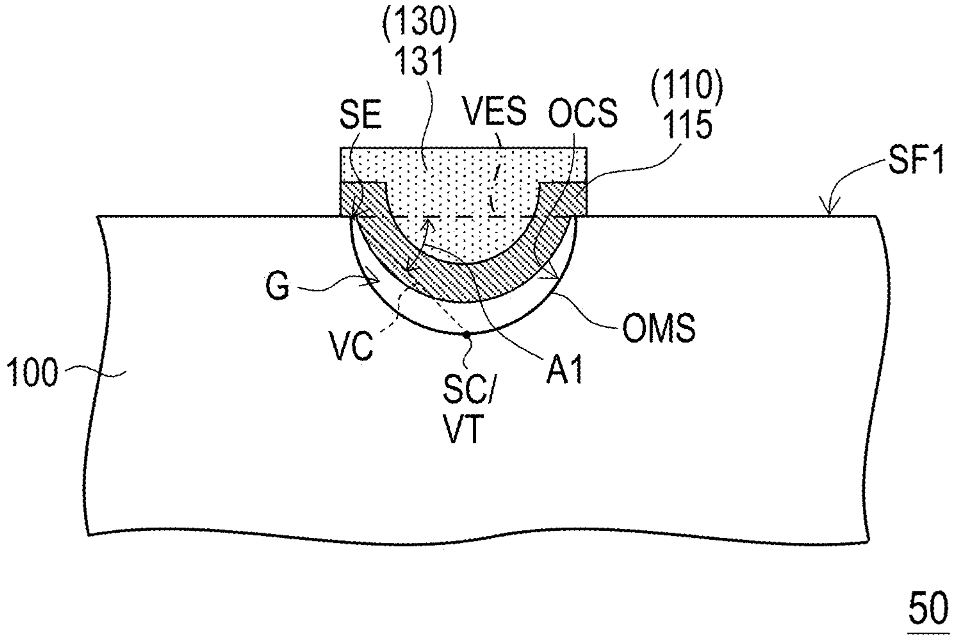
FIG. 2 is an enlarged schematic view of a partial area of the light source module of FIG. 1.

FIG. 1 is a schematic cross-sectional view of a display device according to a first embodiment of the disclosure. FIG. 2 is an enlarged schematic view of a partial area of the light source module of FIG. 1. Referring to FIG. 1 and FIG. 2, a display device 10 includes a display panel DP and a light source module 50. In the embodiment, the display panel DP is, for example, a reflective display panel, but the disclosure is not limited thereto. In other embodiments, the display panel DP may also be electronic paper or other suitable objects (such as books) that may display information (e.g., image) by reflecting light.

The light source module 50 is disposed on a side of a display surface DS of the display panel DP, and includes a light guide plate 100 and a light source 150. The material of the light guide plate 100 includes, for example, glass, polycarbonate (PC), polymethylmethacrylate (PMMA), or other suitable light guide plates. The light guide plate 100 has a first surface SF1, a second surface SF2, and a light incident surface IS. The first surface SF1 and the second surface SF2 are opposite to each other, and both are connected to the light incident surface IS. The second surface SF2 faces the display surface DS of the display panel DP. The light source 150 is disposed on a side of the light incident surface IS of the light guide plate 100 and is configured to emit light L toward the light incident surface IS.

It is particularly noted that within the visible light wavelength range (380 nm to 780 nm), in an embodiment, the difference in the absorption rate of the light guide plate 100 for light of various wavelengths is less than 10%, preferably less than 5%, and most preferably less than 1%, so as to reduce the color shift of the light. The material of the light guide plate 100 is, for example, high alumina glass or alkali-free glass.

A plurality of optical microstructures OMS are provided on the first surface SF1 of the light guide plate 100. In the embodiment, the shape of the optical microstructure OMS is, for example, hemispherical, but the disclosure is not limited thereto. In other embodiments, the shape of the optical microstructure OMS may also be a cone, a flat-top cone, a polyhedron, or an irregular shape.

In the embodiment, the optical microstructure OMS has an optical curved surface OCS recessed from the first surface SF1 and a structural edge SE connected to the first surface SF1, and there is a microstructure vertex VT on the optical curved surface OCS (that is, the position of the farthest vertical distance between the optical curved surface OCS and a virtual extension surface VES of the first surface SF1, and the microstructure vertex VT is, for example, a symmetry center SC of the optical curved surface OCS). There is a virtual connection line VC between the microstructure vertex VT of the optical curved surface OCS and any point on the structural edge SE, and an angle A1 between the virtual connection line VC and the virtual extension surface VES of the first surface SF1 may be greater than or equal to 35 degrees and less than or equal to 40 degrees. In this way, the light L transmitted in the light guide plate 100 may be guided to the display panel DP after being reflected or scattered by the optical microstructure OMS and may be incident on the display surface DS at a relatively positive angle.

It should be noted that since the optical microstructure OMS of the embodiment is symmetrical structure, the optical microstructure OMS may be fabricated using an etching process on the glass light guide plate, but the disclosure is not limited thereto.

In the embodiment, the light source module 50 further includes a reflection layer 110 disposed on the light guide plate 100, and may selectively include an absorption layer 130. The reflection layer 110, for example, is disposed on the first surface SF1. The reflection layer 110 includes a plurality of reflection units 115, and the reflection units 115 respectively overlap the plurality of optical microstructures OMS along the normal direction of the first surface SF1. The absorption layer 130 includes a plurality of absorption units 131 (e.g., first absorption units), and the absorption units 131 respectively overlap at least a part of the plurality of reflection units 115 along the normal direction of the first surface SF1 (that is, the number of the reflection units 115 may be greater than or equal to the number of the absorption units 131). The at least a part of the reflection units 115 are located between the corresponding absorption units 131 and the plurality of optical microstructures OMS. It is particularly noted that within the visible light wavelength range (380 nm to 780 nm), the difference in the absorption rates of the reflection layer 110 (the absorption layer 130) for light of various wavelengths is less than 10%, preferably less than 5%, and most preferably less than 1%, so as to reduce the color shift of the light.

More specifically, in the embodiment, the reflection unit 115 is provided between any group of overlapping optical microstructure OMS and the absorption unit 131 (that is, the number of the reflection units 115 is equal to the number of the absorption units 131). Or rather, both the reflection unit 115 and the absorption unit 131 only exist at positions where the optical microstructure OMS is provided, and in any direction parallel to the first surface SF1, the respective widths of the reflection unit 115 and the absorption unit 131 are substantially equal to or approximately the width of the optical microstructure OMS (e.g., the difference is less than 5% of the width of the optical microstructure OMS).

It is particularly noteworthy that any optical microstructure OMS is recessed from the first surface SF1 to the inside of the light guide plate 100 and has the microstructure vertex VT, and there is a gap G provided between any reflection unit and the microstructure vertex VT of the overlapping optical microstructure OMS thereof. For example, in the embodiment, any reflection unit 115 does not cover (directly contact) the optical curved surface OCS of the overlapping optical microstructure OMS thereof. That is to say, the gap G between the reflection unit 115 and the optical curved surface OCS may extend from the microstructure vertex VT to the structural edge SE. However, the disclosure is not limited thereto. In other embodiments, the reflection unit 115 may extend from the structural edge SE to cover (directly contact) a part of the optical curved surface OCS of the optical microstructure OMS.

In the embodiment, the reflection layer 110 may be formed by printing or spraying white ink with high reflective (scattering) properties, or may be formed by curing the ink containing metal ions (such as silver or aluminum) by ultraviolet irradiation (or high temperature) to precipitate metal particles, but the disclosure is not limited thereto. In other embodiments, the reflection layer 110 may be a stacked structure of multi-layer dielectric films, or a foam material containing a plurality of micro-voids, or may also be a metal (such as silver or aluminum) nanoparticles coated with a polymer material.

In the embodiment, since there is a gap G provided between the reflection layer 110 and the optical curved surface OCS of the optical microstructure OMS, when the light L is transmitted to the optical microstructure OMS, a part of the light L is totally internally reflected by the optical curved surface OCS and emitted toward a side of the second surface SF2, which has higher efficiency; another part of the light L is emitted toward a side of the first surface SF1 after being refracted by the optical curved surface OCS. Therefore, through the arrangement of the reflection layer 110, the light L refracted and deflected by the optical microstructure OMS may be reflected back to the light guide plate 100, thereby improving the light leakage phenomenon and simultaneously improving the light energy utilization rate of the light source module 50.

On the other hand, the absorption layer 130 is disposed on a side of the reflection layer 110 facing away from the light guide plate 100 and is configured to absorb light (e.g., ambient light ABL) from a side of the first surface SF1 of the light guide plate 100. The absorption rate of the absorption layer 130 for the ambient light ABL (or visible light) is at least greater than 50%, preferably greater than or equal to 90%. Specifically, the ratio of the reflectance of the absorption layer 130 to the reflectance of the reflection layer 110 may be less than or equal to 0.1.

In the embodiment, the absorption layer 130 may be made of a colloid or resin material with light-absorbing particles that is cured by ultraviolet irradiation or high temperature, but the disclosure is not limited thereto. In other embodiments, the absorption layer 130 may be formed by covering the reflection layer 110 with metal oxide or black paint using film coating or coating, or may be formed by oxidizing the silver or aluminum metal present in the reflection layer 110, or may also be formed by chemically reacting the white pigment in the white ink with a solution containing metal ions (e.g., a solution of barium sulfate ($BaSO_4$) and silver ions ($Ag^+$) forms black silver sulfide ($Ag_2S$)).

Through the arrangement of the absorption layer 130, the reflection of the light (such as the ambient light ABL) from a side of the first surface SF1 of the light guide plate 100 may be reduced and the stray light may be suppressed, which helps to improve the image contrast of the display image displayed by the display device 10. Specifically, in order to ensure that the display device 10 has sufficient display brightness when the ambient light ABL is used as the display illumination light source, the percentage value of the orthographic projection area of the absorption layer 130 on the first surface SF1 to the surface area of the first surface SF1 may be less than or equal to 10%.

On the other hand, the size of the orthographic projection of the unit composed of any group of overlapping optical microstructure OMS, reflection unit 115, and absorption unit 131 on the first surface SF1 is smaller than the size of the orthographic projection of the pixel (not shown) of the display panel DP on the first surface SF1, so as to avoid the sparkle mura that occurs when the viewing angle is changed. Preferably, the size of the orthographic projection of the unit composed of any group of overlapping optical microstructure OMS, reflection unit 115, and absorption unit 131 on the first surface SF1 is smaller than the size of the orthographic projection of the sub-pixel (not shown) of the display panel DP on the first surface SF1.

Furthermore, in the embodiment, the method of forming the overlapping optical microstructure OMS, reflection layer 110, and absorption layer 130 may include the following steps: covering the light guide plate with a protective layer, and using laser dotting or etching processes to remove a part of the protective layer and a part of the light guide plate to form a protective layer with a plurality of cavities and a plurality of optical microstructures overlapping the cavities. Using film coating or inkjet methods, reflective materials and absorbing materials are sequentially covered on the plurality of optical microstructures to form the reflection layer and the absorption layer. When the optical microstructure is a recessed structure, the printed ink may be filled in the recessed structure, but the disclosure is not limited thereto.

On the other hand, in order to increase the accuracy of printing, during the process of printing the reflective materials and the absorbing materials, a mask with a plurality of apertures may also be used to cover the light guide plate. The apertures are respectively aligned with the plurality of optical microstructures of the light guide plate, but the disclosure is not limited thereto. In addition, since a plurality of inkjet holes of the nozzle head used in the inkjet process are arranged with equal spacings, the spacing between the plurality of optical microstructures, the plurality of reflection units, and the plurality of absorption units of the light guide plate must also be an integer multiple of the inkjet hole spacing. Since the position of the ink may shift when the ink falls onto the optical microstructure, the spacing between the reflection units and the absorption units may be slightly different from an integer multiple of the inkjet hole spacing. Such a difference is less than one-half of the inkjet hole spacing.

In the embodiment, the display device 10 may further include a touch module TM disposed on a side of the first surface SF1 of the light guide plate 100. However, the disclosure is not limited thereto. In other embodiments, the touch module TM may also be replaced by a glass cover or other functional modules. In the embodiment, the touch module TM may be attached to the first surface SF1 of the light guide plate 100 via an adhesive layer 200. Generally speaking, in order to reduce the interface reflection, the refractive index of the adhesive layer 200 is as close as possible to the refractive indexes of the touch module TM and the light guide plate 100, or between the refractive indexes of the two. However, when it is necessary to increase the total reflection of the light L emitted by the light source 150 at the interface between the light guide plate 100 and the adhesive layer 200 (i.e., the first surface SF1), the refractive index of the adhesive layer 200 will be designed to be smaller than the refractive index of the light guide plate 100.

In an embodiment, when the light guide plate is made of plastic material, the touch module, the glass cover, or other functional modules may have a UV resistance function. For example, UV blockers are coated on the surface of the above modules, or UV blockers are added to the materials to reduce the ultraviolet transmittance. This may reduce the exposure of the plastic light guide plate to the irradiation of external UV rays (such as sunlight) and avoid deterioration (such as yellowing) of the light guide plate. The ultraviolet transmittance of the above-mentioned modules is, for example, less than 10%, preferably less than 5%, and most preferably less than 1%.

In particular, since the reflection layer 110 and the absorption layer 130 is provided on the optical microstructure OMS of the light guide plate 100, the touch module TM of the embodiment may be attached to the first surface SF1 of the light guide plate 100 in a fully bonding manner. That is, the adhesive layer 200 may directly cover (directly contact) the absorption layer 130, and the first surface SF1. Therefore, the display device 10 of the embodiment may have higher structural strength and environmental resistance.

Other embodiments are provided below for elaborations in the disclosure, where the same components are marked by the same reference numbers, and the description of the same technical content will be omitted. The omitted descriptions may be referred to as what is provided in the previous embodiments and thus will not be further provided hereinafter.

Figure 3A:
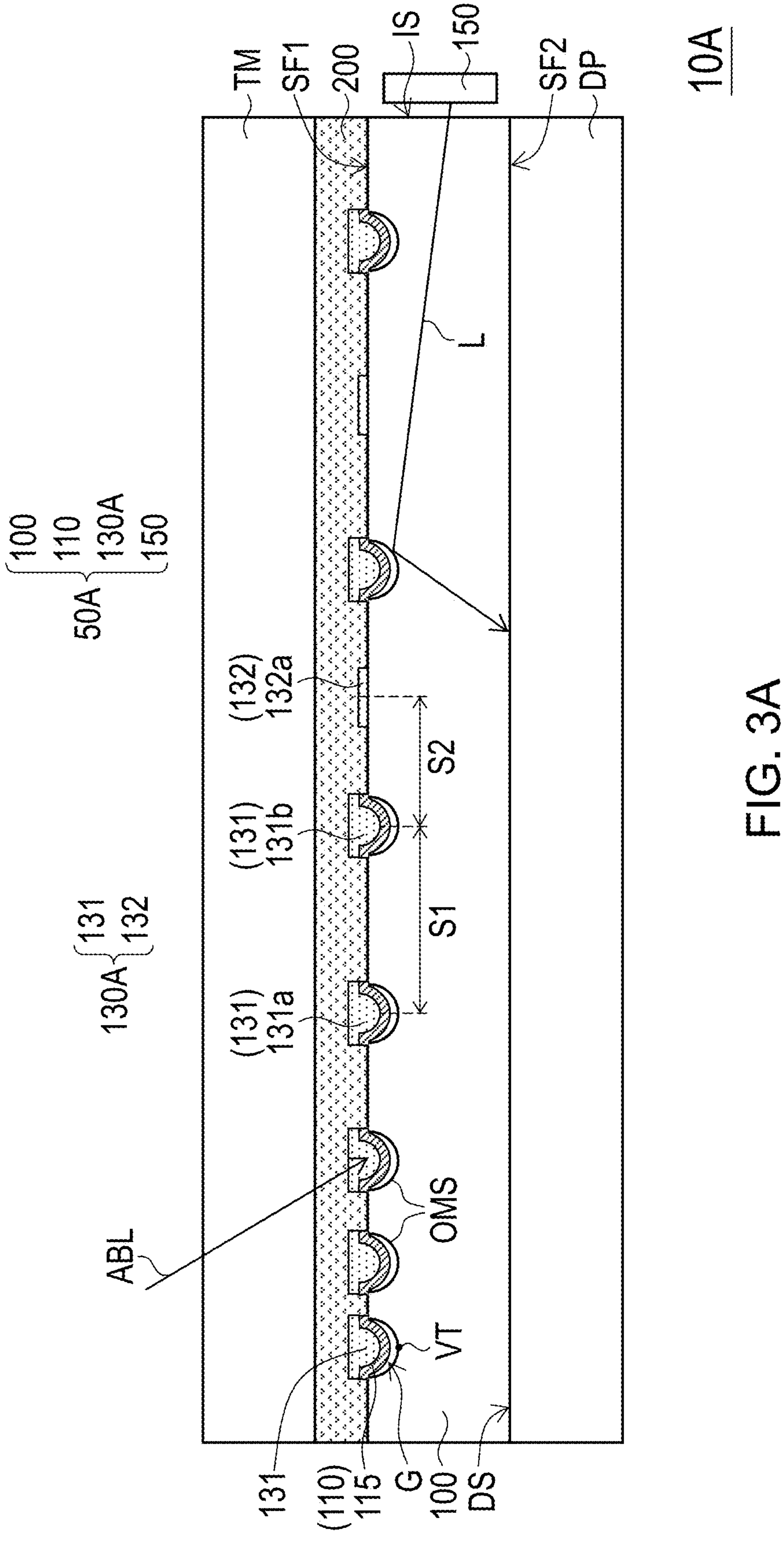
FIG. 3A is a schematic cross-sectional view of a display device according to a second embodiment of the disclosure.

FIG. 3A is a schematic cross-sectional view of a display device according to a second embodiment of the disclosure. Referring to FIG. 3A, the only difference between a display device 10A of the embodiment and the display device 10 of FIG. 1 lies in that the arrangement of the absorption layer is different. Specifically, in a light source module 50A of the embodiment, an absorption layer 130A also includes a plurality of absorption units 132 (i.e., second absorption units), and the absorption units 132 do not overlap the plurality of optical microstructures OMS and the plurality of reflection units 115 along the normal direction of the first surface SF1. That is to say, the reflection units 115 and the optical microstructures OMS are not provided at the locations where a part of the absorption units of the absorption layer 130A is disposed.

Specifically, the plurality of absorption units 131 and the plurality of absorption units 132 of the absorption layer 130A may be arranged with equal spacings or approximately equal spacings on the first surface SF1 of the light guide plate 100 to increase the concealment of the absorption units. In the embodiment, the plurality of absorption units 131 and the plurality of absorption units 132 are arranged with approximately equal spacings. For example, there is a spacing S1 between the adjacently arranged first (e.g., an absorption unit 131*a*) and second ones (e.g., an absorption unit 131*b*) of the plurality of absorption units 131 and the plurality of absorption units 132 along any direction parallel to the first surface SF1, and there is a spacing S2 between the adjacently arranged second (e.g., the absorption unit 131*b*) and third ones (e.g., an absorption unit 132*a*) of the plurality of absorption units 131 and the plurality of absorption units 132 along the any direction parallel to the first surface SF1, and the difference between the spacing S1 and the spacing S2 is less than one-half of the average value of the spacing S1 and the spacing S2.

From another perspective, the absorption layers 130A arranged on the light guide plate 100 with equal spacings or approximately equal spacings may have a more uniform distribution density. Therefore, the reflectivity distribution of the light source module 50A for the ambient light ABL will be more uniform, thereby improving the uniformity of the display brightness of the display device 10A.

Figure 3B:
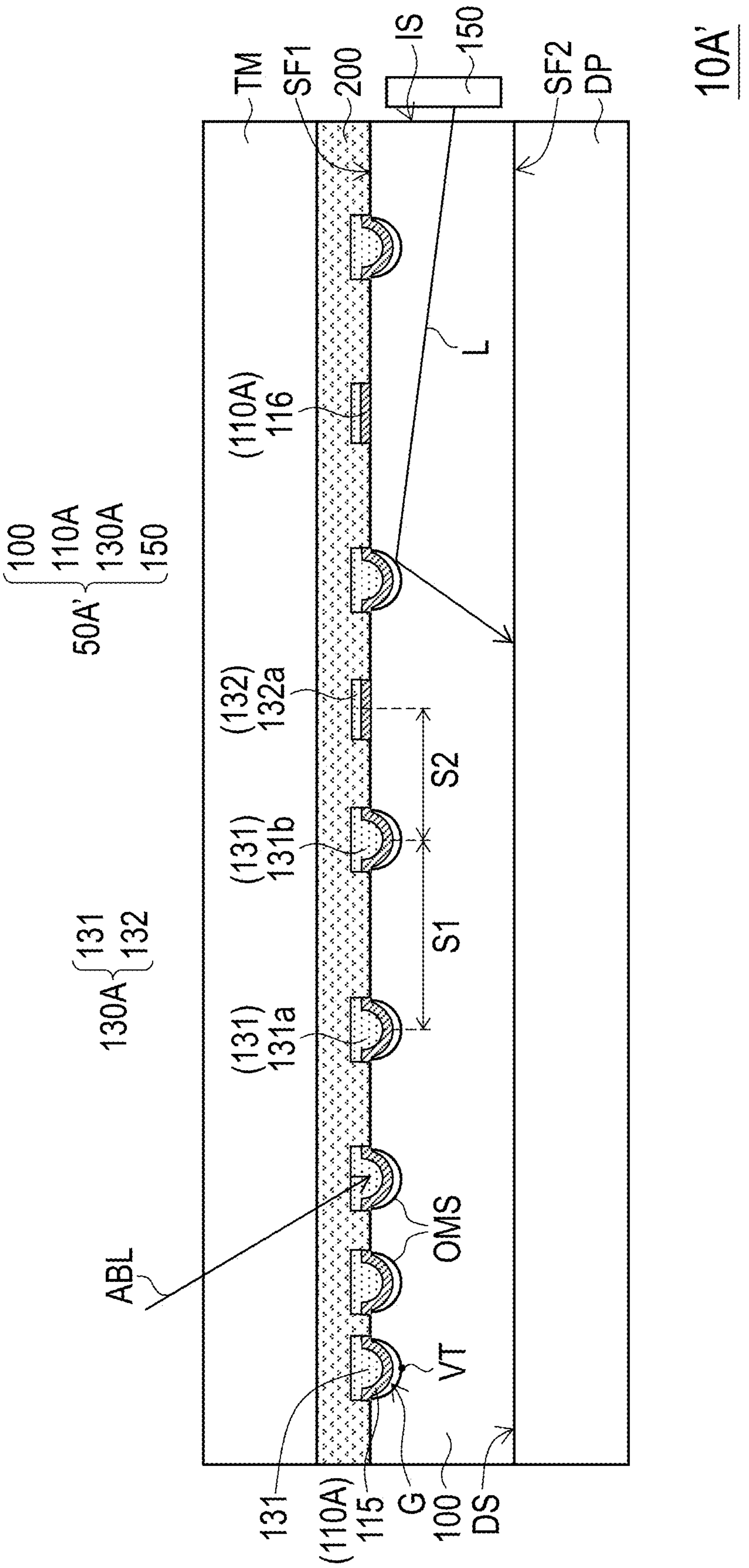
FIG. 3B is a schematic cross-sectional view of another modified embodiment of the display device of FIG. 3A.

FIG. 3B is a schematic cross-sectional view of another modified embodiment of the display device of FIG. 3A. Referring to FIG. 3B, the only difference between a display device 10A' of the embodiment and the display device 10A of FIG. 3A lies in that the arrangement of the Specifically, in a light source module 50A' of the embodiment, a reflection layer is different, reflection layer 110A also includes a plurality of reflection units 116 (i.e., auxiliary reflection units), and the reflection units 116 do not overlap the plurality of optical microstructures OMS and the plurality of absorption units 131 along the normal direction of the first surface SF1, and in the embodiment, the plurality of reflection units 116 respectively overlap the corresponding plurality of absorption units 132 (i.e., the second absorption units). That is to say, the optical microstructures OMS are not provided at the locations where a part of the reflection units of the reflection layer 110A is disposed. In the embodiment, the reflection unit 116 is disposed between the absorption unit 132 and the light guide plate 100, which may reduce the light L transmitted in the light guide plate 100 to be absorbed by the plurality of absorption units 132. In another embodiment, a part of the reflection units 116 may not overlap the absorption units 132, that is, a part of the reflection units 116 may not overlap the plurality of optical microstructures OMS, the plurality of absorption units 131, and the plurality of absorption units 132.

It is particularly noted that in the embodiments of FIG. 1, FIG. 2, FIG. 3A, and FIG. 3B, the corresponding absorption units are disposed above the reflection units. Through the arrangement of the absorption units, the reflection of the ambient light may be reduced and the stray light may be suppressed. However, the disclosure is not limited thereto. In an embodiment, the first absorption units may not be disposed above a part of the reflection units (e.g., the number of the reflection units 115 is greater than the number of the absorption units 131), and/or the auxiliary reflection units that do not overlap the optical microstructures, the first absorption units, and the second absorption units may be disposed. The reflection units and the auxiliary reflection units (i.e., pattern reflection units) without being provided with the corresponding absorption units may be arranged into specific patterns (such as logo patterns or names), which may reflect the ambient light to allow users to vaguely observe the specific pattern. The number of the pattern reflection units accounts for less than 10% of the reflection units.

Figure 3C:
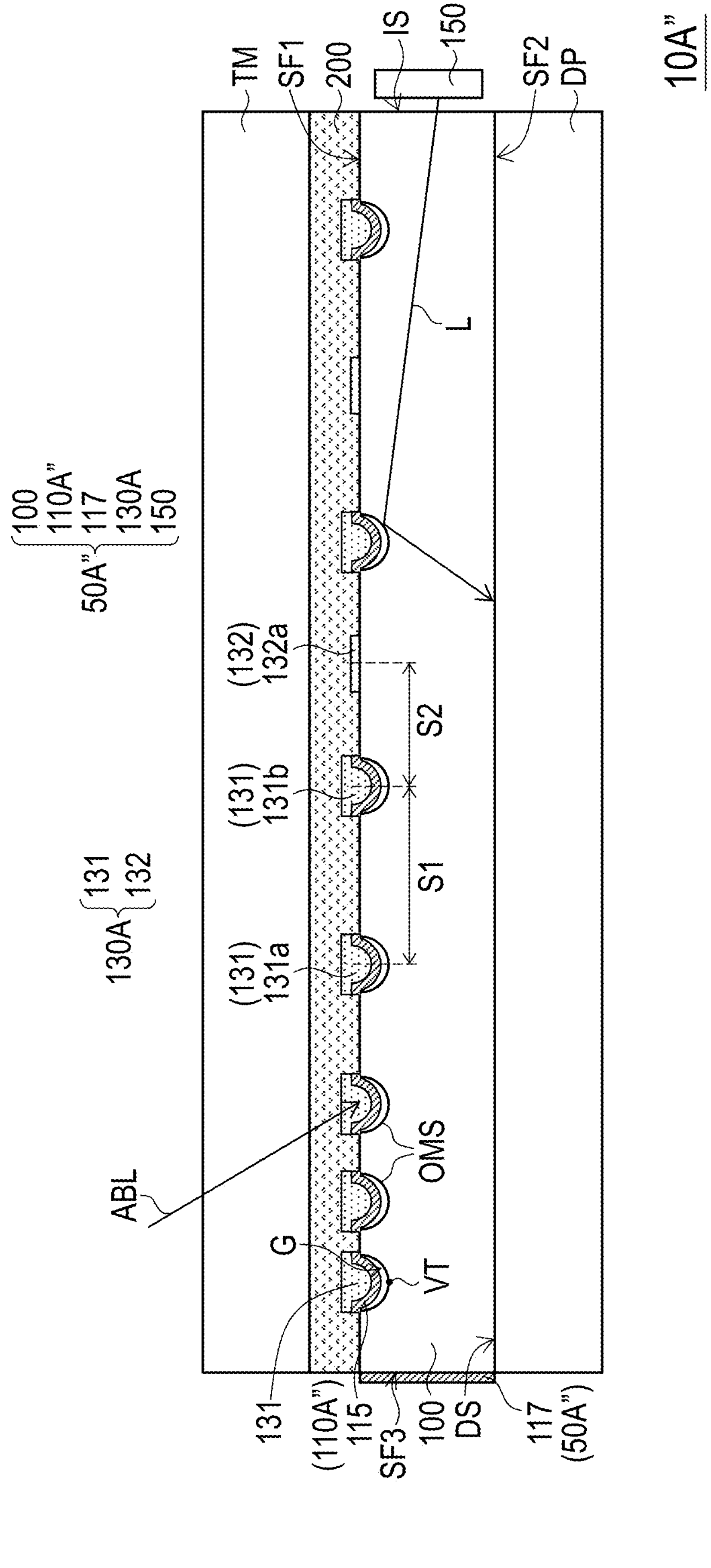
FIG. 3C is a schematic cross-sectional view of still another modified embodiment of the display device of FIG. 3A.

FIG. 3C is a schematic cross-sectional view of still another modified embodiment of the display device of FIG. 3A. Referring to FIG. 3C, the only difference between a display device 10A" of the embodiment and the display device 10A of FIG. 3A lies in that the arrangement of the reflection layer is different. Specifically, in a light source module 50A" of the embodiment, the light source module 50A" further includes a side reflection unit 117. The light guide plate 100 also has a third surface SF3 that connects the first surface SF1 and the second surface SF2 and is opposite to the light incident surface IS, and the side reflection unit 117 is disposed on the third surface SF3 of the light guide plate 100. Through the arrangement of the side reflection unit 117, the light energy utilization rate of the light source module 50A" may be further improved.

Figure 4:
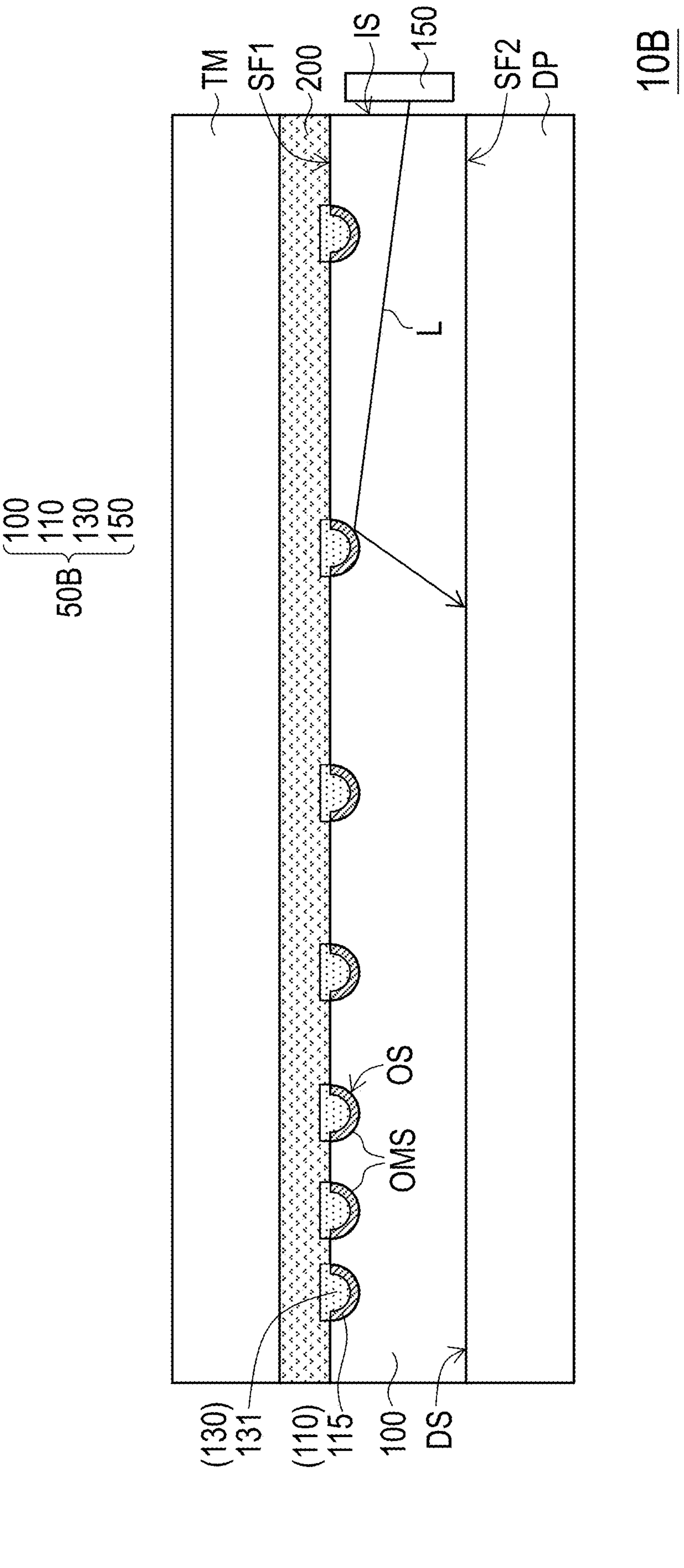
FIG. 4 is a schematic cross-sectional view of a display device according to a third embodiment of the disclosure.

FIG. 4 is a schematic cross-sectional view of a display device according to a third embodiment of the disclosure. Referring to FIG. 4, the only difference between a display device 10B of the embodiment and the display device 10 of FIG. 1 lies in that the arrangement of the absorption layer and the reflection layer is different. Specifically, in a light source module 50B of the embodiment, the reflection layer 110 and the absorption layer 130 may fill up the plurality of optical microstructures OMS. That is, there is no gap G as shown in FIG. 1 between the reflection layer 110 and an optical surface OS of the optical microstructure OMS. From another perspective, in the embodiment, the reflection layer 110 directly covers the optical surface OS of the optical microstructure OMS.

In particular, by filling up the plurality of optical microstructures OMS with the reflection layer 110 and the absorption layer 130, the surface flatness of the light guide plate 100 on the first surface SF1 may be significantly increased, thereby preventing the light from being scattered when passing through the first surface SF1. On the other hand, in order to increase the adhesion of the reflection layer 110 on the optical surface OS of the optical microstructure OMS, the reflection layer 110 may be made of a mixture of highly reflective metal and a small amount of adhesive, but the disclosure is not limited thereto.

Figure 5:
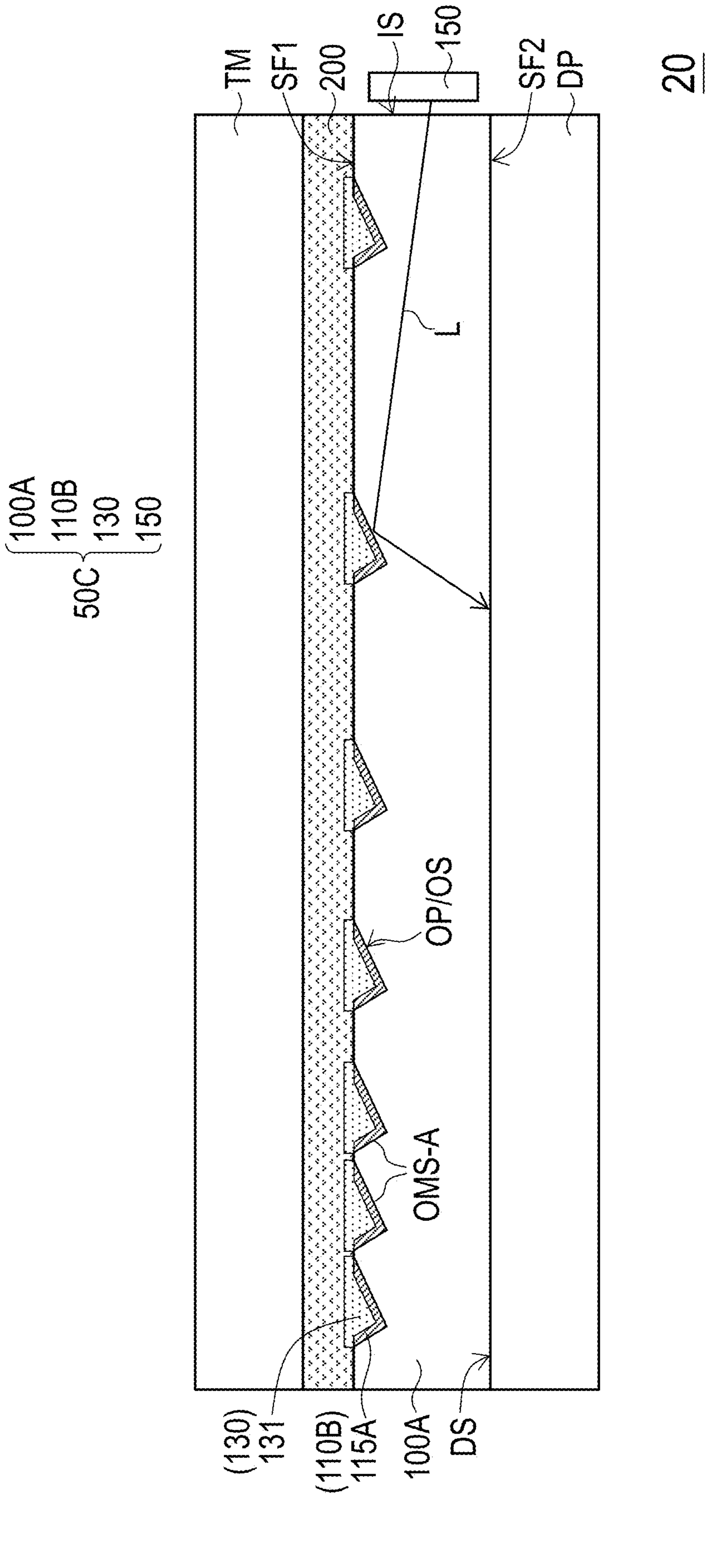
FIG. 5 is a schematic cross-sectional view of a display device according to a fourth embodiment of the disclosure.
Figure 6:
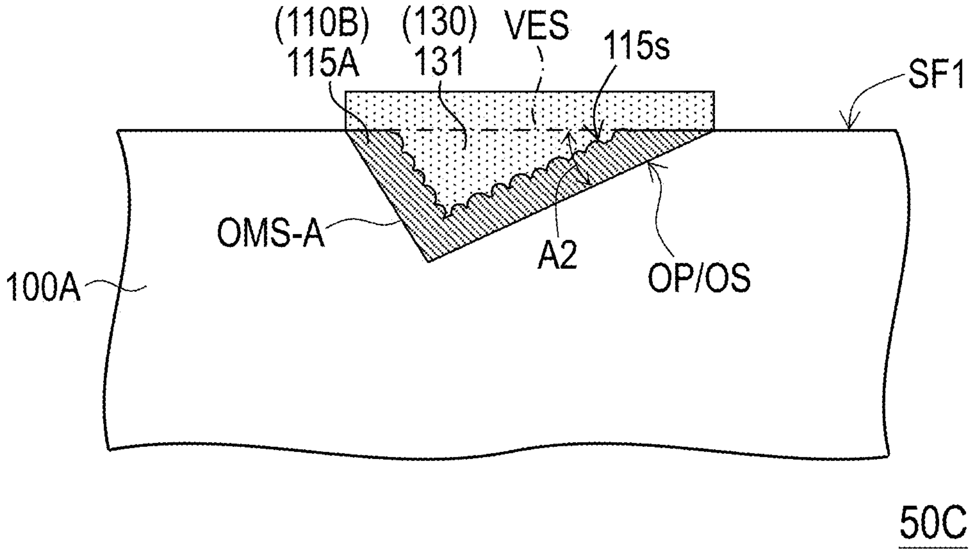
FIG. 6 is an enlarged schematic view of a partial area of the light source module of FIG. 5.

FIG. 5 is a schematic cross-sectional view of a display device according to a fourth embodiment of the disclosure. FIG. 6 is an enlarged schematic view of a partial area of the light source module of FIG. 5. Referring to FIG. 5 and FIG. 6, the main difference between a display device 20 of the embodiment and the display device 10B of FIG. 4 lies in that the configuration of the optical microstructure is different. Specifically, in a light source module 50C of the embodiment, an optical microstructure OMS-A of a light guide plate 100A has an asymmetric structure.

For example, the cross-sectional profile of the optical microstructure OMS-A on a plane perpendicular to the light incident surface IS and the first surface SF1 may be triangular. In detail, in the embodiment, the optical microstructure OMS-A has an optical plane OP facing the light incident surface IS, and an angle A2 between the optical plane OP and the virtual extension surface VES of the first surface SF1 may be greater than or equal to 35 degrees and less than or equal to 40 degrees. In this way, the light L transmitted in the light guide plate 100A may be guided to the display panel DP after being reflected by the optical microstructure OMS-A and may be incident on the display surface DS at a relatively positive angle.

It is particularly noted that in the embodiment, a surface 115*s* of a reflection unit 115A filled in the optical microstructure OMS-A may have scattering properties, that is, the surface 115*s* may be a non-smooth surface. More specifically, a reflection layer 110B includes a plurality of reflection units 115A, and the surface roughness of a reflection unit 115A is greater than the surface roughness of the optical surface OS (that is, the optical plane OP) that it directly covers. For example, the reflection layer 110B of the embodiment may be formed by coating the ink doped with metal ions (such as silver ions or aluminum ions) on the optical surface OS of the optical microstructure OMS-A via a jet printing or screen printing process, and curing it via ultraviolet irradiation or high temperature. The curing step will cause metal to precipitate and adhere to the optical surface OS.

Since the reflection layer 110B in the embodiment has scattering properties due to its large surface roughness, the light incident on a side of the first surface SF1 of the light guide plate 100A and partially transmitted through the absorption layer 130 may be more divergently distributed in the viewing space of the display device 20 after being reflected by the reflection layer 110B, which reduces the interference of reflected light on the display image of the display device 20 and helps to improve the display quality of the display device 20.

Figure 7:
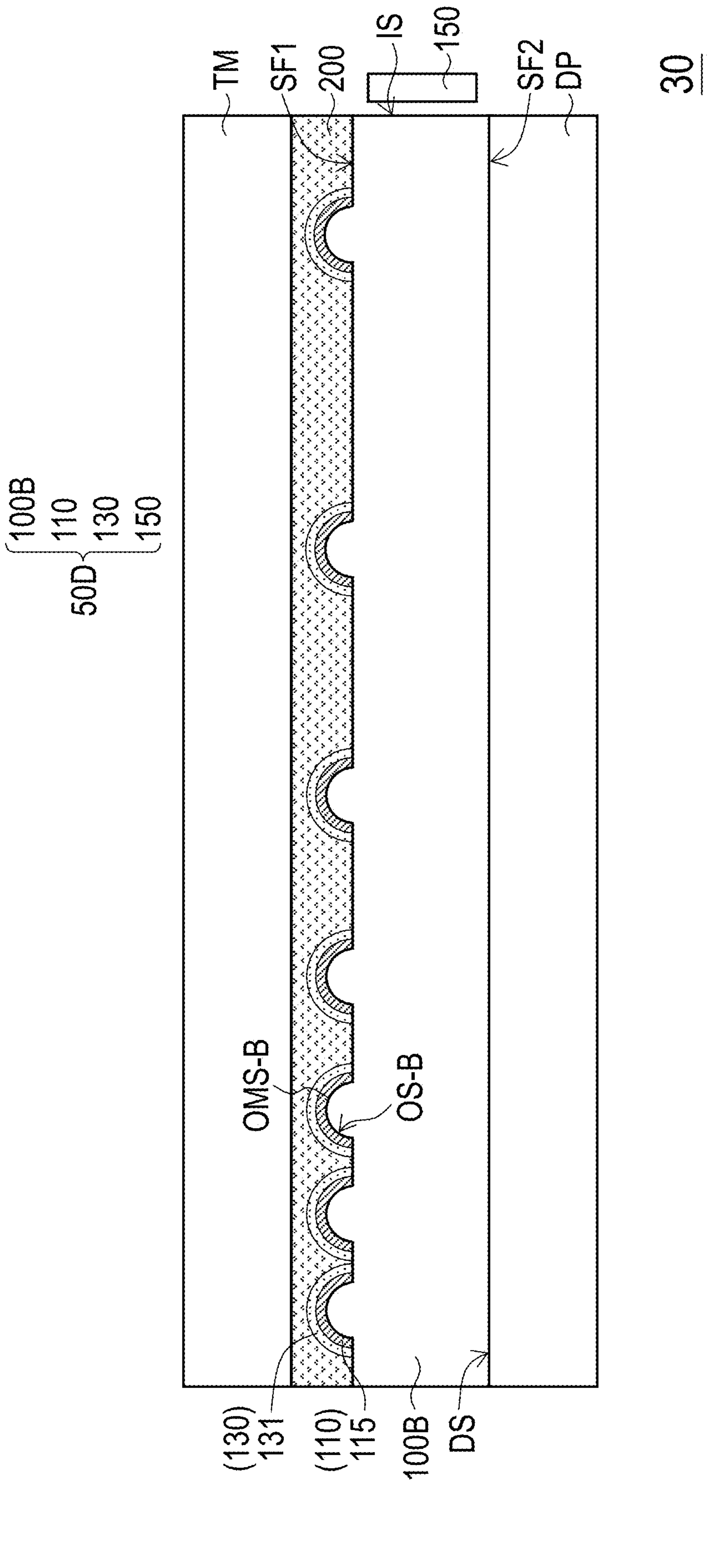
FIG. 7 is a schematic cross-sectional view of a display device according to a fifth embodiment of the disclosure.
Figure 8:
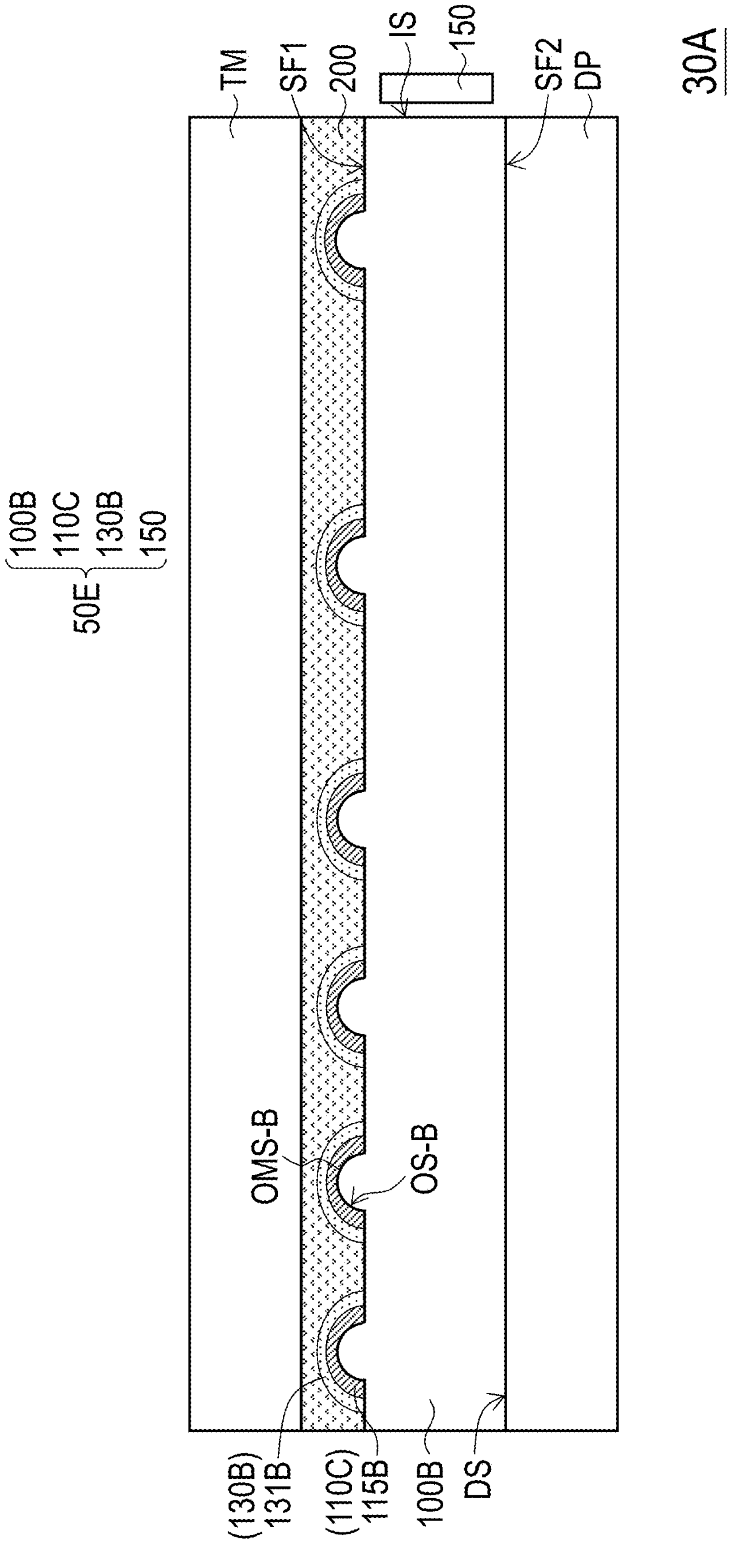
FIG. 8 is a schematic cross-sectional view of a display device according to a sixth embodiment of the disclosure.

FIG. 7 is a schematic cross-sectional view of a display device according to a fifth embodiment of the disclosure. FIG. 8 is a schematic cross-sectional view of a display device according to a sixth embodiment of the disclosure. Referring to FIG. 7, the difference between a display device 30 of the embodiment and the display device 10 of FIG. 1 lies in that the optical microstructure is disposed on the first surface in different ways. Specifically, in a light source module 50D of the embodiment, each of a plurality of optical microstructures OMS-B protrudes from the first surface SF1 of a light guide plate 100B. Therefore, the reflection layer 110 and the absorption layer 130 covering an optical surface OS-B of the optical microstructure OMS-B protruding from the first surface SF1 are also disposed to be protruding from the first surface SF1.

It should be noted that in the embodiment, the reflection layer 110 may also be replaced by the reflection layer 110B with a larger surface roughness in FIG. 6 to further improve the display quality of the display device 30.

In the embodiment, the reflection layer 110 and the absorption layer 130 are substantially conformal to the optical surface OS-B of the optical microstructure OMS-B. However, the disclosure is not limited thereto. Referring to FIG. 8, in a display device 30A of another embodiment, in addition to the aforementioned functions, a reflection layer 110C and an absorption layer 130B of a light source module 50E may also be used to reduce the unevenness caused when the optical microstructure OMS-B protrudes from the first surface SF1.

For example, the surfaces of the reflection layer 110C and the absorption layer 130B facing away from the light guide plate 100B may be smoother than the optical surface OS-B of the optical microstructure OMS-B.

It is particularly noted that the optical microstructure OMS-B and the light guide plate 100B in FIG. 7 and FIG. 8 may be integrally formed, but the disclosure is not limited thereto. In other embodiments, the optical microstructure OMS-B may also be replaced by a microstructure formed by scattering ink or UV glue.

Figure 9:
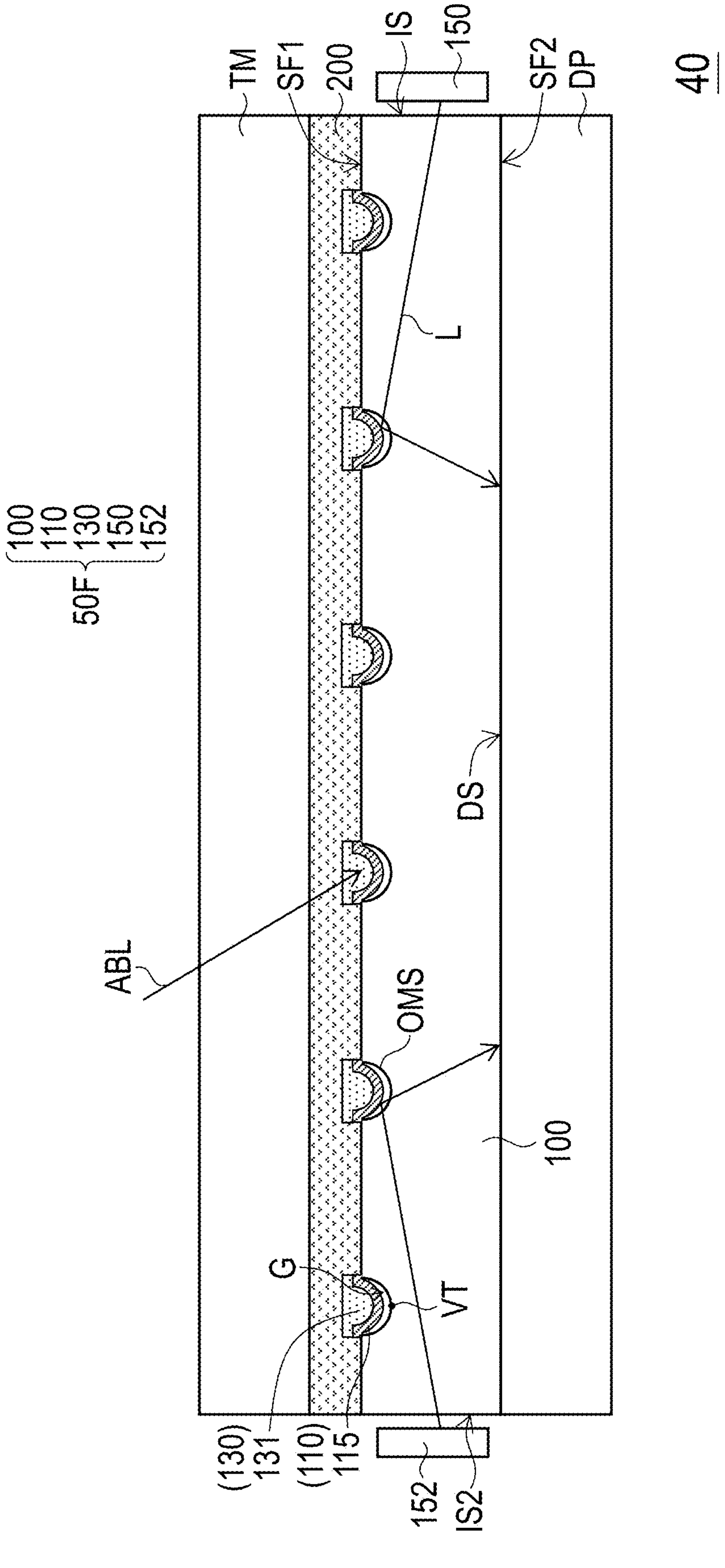
FIG. 9 is a schematic cross-sectional view of a display device according to a seventh embodiment of the disclosure.

FIG. 9 is a schematic cross-sectional view of a display device according to a seventh embodiment of the disclosure. Referring to FIG. 9, the main difference between a display device 40 of the embodiment and the display device 10 of FIG. 1 lies in that the number of light sources in the light source module is different. Specifically, in the embodiment, a light source module 50F further includes a light source 152 disposed on a side of a light incident surface IS2 of the light guide plate 100, where the light incident surface IS2 and the light incident surface IS are opposite to each other. That is to say, in the embodiment, the light source 150 and the light source 152 are respectively provided on two opposite sides of the light guide plate 100 in a direction. Therefore, the orthographic projection profile of the optical microstructure OMS on the cross section perpendicular to the first surface SF1, the light incident surface IS, and the light incident surface IS2 must be symmetrical.

In addition, since the light source module 50F of the embodiment is provided with two light sources, the distribution number of the optical microstructure OMS or its orthographic projection area on the first surface SF1 may be lower than those of the light source module 50 of FIG. 1. Therefore, in the embodiment, the design of dual light sources may further improve the transmittance of the light guide plate 100.

Figure 10:
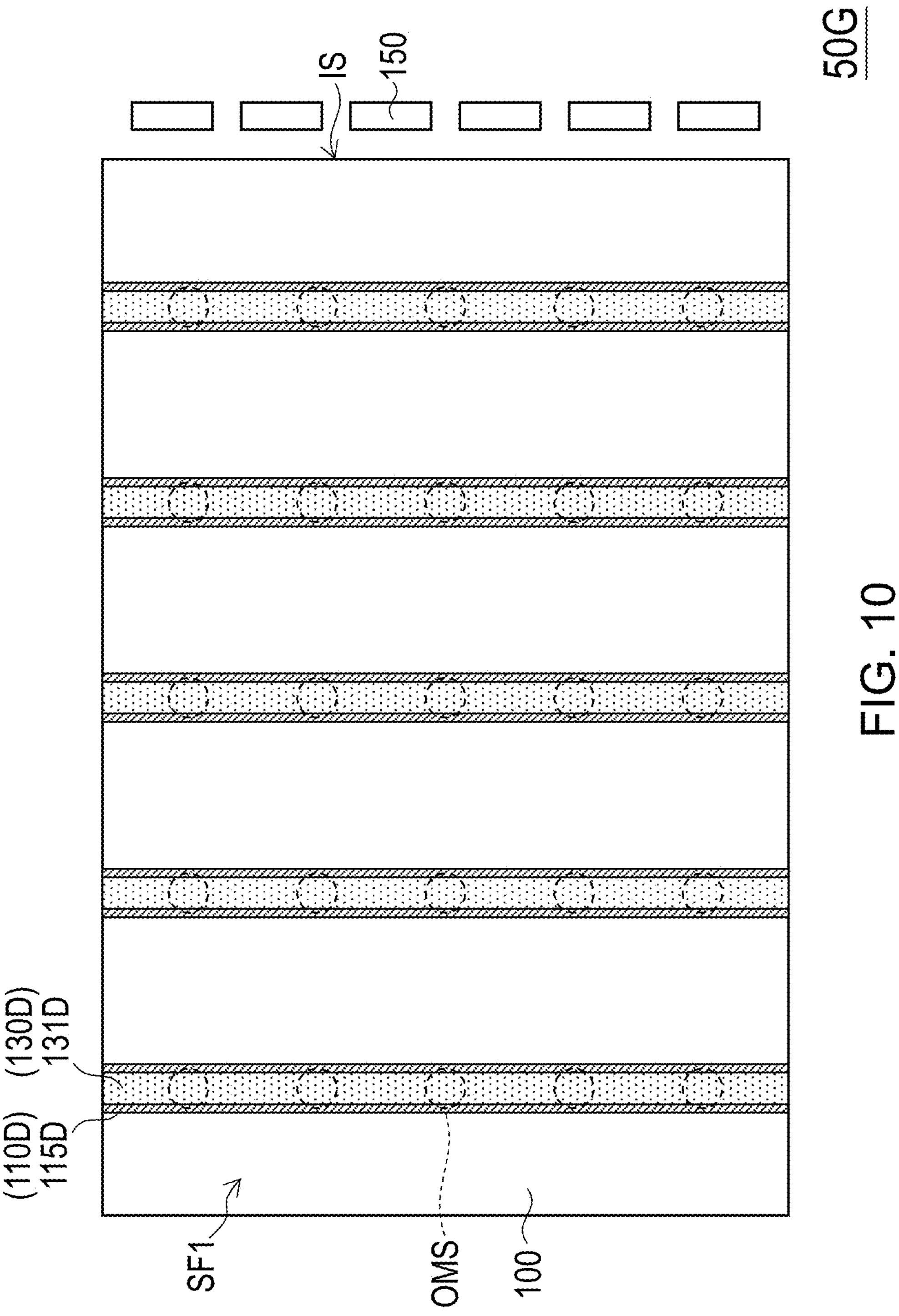
FIG. 10 is a schematic front view of a light source module according to an eighth embodiment of the disclosure.
Figure 11:
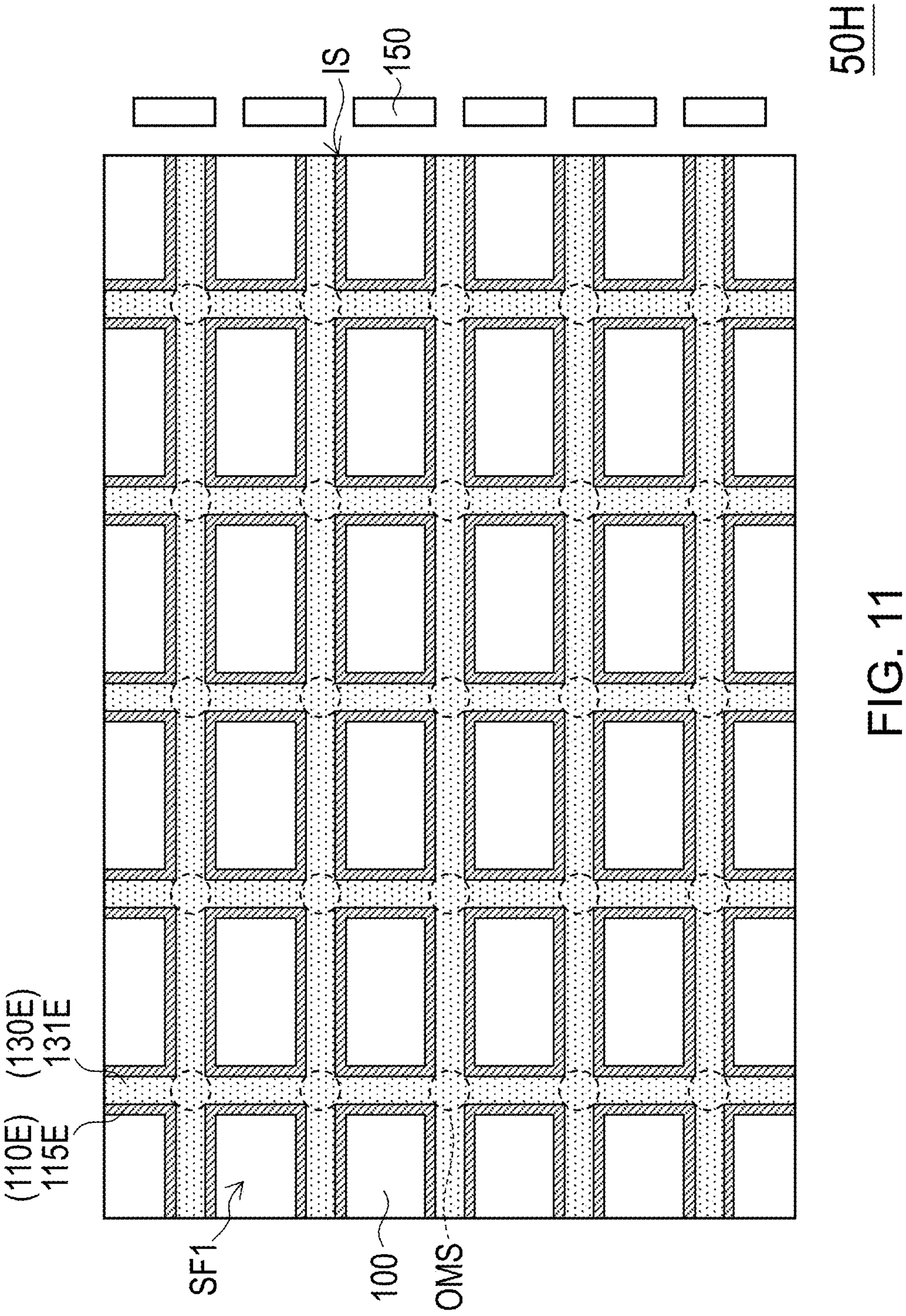
FIG. 11 is a schematic front view of a light source module according to a ninth embodiment of the disclosure.

FIG. 10 is a schematic front view of a light source module according to an eighth embodiment of the disclosure. FIG. 11 is a schematic front view of a light source module according to a ninth embodiment of the disclosure. Referring to FIG. 10, the main difference between a light source module 50G of the embodiment and the light source module 50 of FIG. 1 lies in that the configurations of the reflection layer and the absorption layer are different. More specifically, in the light source module 50G of the embodiment, a reflection layer 110D and an absorption layer 130D are not only disposed to overlap the plurality of optical microstructures OMS.

For example, in the embodiment, each of a plurality of reflection units 115D of the reflection layer 110D and a plurality of absorption units 131D of the absorption layer 130D may extend along a direction parallel to the light incident surface IS. That is to say, the orthographic projections of the plurality of reflection units 115D and the plurality of absorption units 131D of the embodiment on the first surface SF1 of the light guide plate 100 may present a plurality of strip distributions arranged in parallel, and each of the strip may overlap two or more (such as five in FIG. 10, but the disclosure is not limited thereto) optical microstructures OMS. In other words, the adjacent reflection units 115D in the direction parallel to the light incident surface IS are connected to each other, and the adjacent absorption units 131D are connected to each other. Specifically, the percentage value of the orthographic projection area of the absorption layer 130D on the first surface SF1 to the surface area of the first surface SF1 may be less than or equal to 10%.

However, the disclosure is not limited thereto. In a light source module 50H of FIG. 11, in addition to extending in a direction parallel to the light incident surface IS, a plurality of reflection units 115E of a reflection layer 110E and a plurality of absorption units 131E of an absorption layer 130E may also extend in a direction perpendicular to the light incident surface IS. More specifically, the orthographic projections of the reflection layer 110E and the absorption layer 130E on the first surface SF1 of the light guide plate 100 may exhibit a grid-like distribution. In other words, in the direction parallel to the light incident surface IS and perpendicular to the light incident surface IS, the adjacent reflection units 115E are connected to each other, and the adjacent absorption units 131E are connected to each other. Specifically, the percentage value of the orthographic projection area of the absorption layer 130E on the first surface SF1 to the surface area of the first surface SF1 may be less than or equal to 10%.

It should be noted that, for the sake of clear presentation, the width of the reflection unit of the reflection layer in the extending direction thereof in FIG. 10 and FIG. 11 is wider than the width of the absorption unit of the absorption layer in the extending direction thereof. However, the disclosure is not limited thereto. In some embodiments, the above-mentioned width of the reflection unit may be substantially equal to or smaller than the above-mentioned width of the absorption unit.

To sum up, in the light guide plate according to an embodiment of the disclosure, the absorption layer and the reflection layer are also provided on the surface provided with the plurality of optical microstructures. The plurality of absorption units of the absorption layer are disposed to overlap the optical microstructures, and the reflection unit of the reflection layer is provided between any group of overlapping optical microstructures and absorption units. Through the above configuration, the light guide plate according to the embodiment of the disclosure has at least one of the following advantages: it may prevent the light transmitted in the light guide plate from being refracted by the optical microstructure and then emitted to form light leakage, and it may reduce the reflection of the ambient light and suppress the stray light. In addition, the light source module using the above-mentioned light guide plate is adapted for full lamination with other functional modules, which helps to form a display device with high structural strength and high resistance.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure”, “the present disclosure” or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A light guide plate, the light guide plate comprising a plurality of optical microstructures, wherein:

the plurality of optical microstructures are disposed on a first surface of the light guide plate, an absorption layer and a reflection layer are also provided on the light guide plate, the reflection layer comprises a plurality of reflection units, the plurality of reflection units respectively overlap the plurality of optical microstructures, the absorption layer comprises a plurality of first absorption units, the plurality of first absorption units respectively overlap at least a part of the plurality of reflection units, and the at least a part of the plurality of reflection units are located between the corresponding plurality of first absorption units and the plurality of optical microstructures, wherein the absorption layer further comprises a plurality of second absorption units, the plurality of second absorption units do not overlap the plurality of optical microstructures and the plurality of reflection units, the plurality of second absorption units are disposed on the first surface of the light guide plate, and an absorption rate of the plurality of second absorption units is greater than 50%.

2. The light guide plate according to claim 1, wherein the reflection layer further comprises a plurality of auxiliary reflection units, and the plurality of auxiliary reflection units respectively overlap the plurality of second absorption units.

3. The light guide plate according to claim 1, wherein the reflection layer further comprises a plurality of auxiliary reflection units, and the plurality of auxiliary reflection units do not overlap the plurality of optical microstructures and the plurality of first absorption units.

4. The light guide plate according to claim 1, wherein there is a first spacing between adjacently arranged first and second ones of the plurality of first absorption units and the plurality of second absorption units along any direction parallel to the first surface, there is a second spacing between adjacently arranged second and third ones of the plurality of first absorption units and the plurality of second absorption units along any of the direction, and a difference between the first spacing and the second spacing is less than one-half of an average value of the first spacing and the second spacing.

5. The light guide plate according to claim 1, wherein each of the plurality of optical microstructures is recessed from the first surface toward an inside of the light guide plate and has a microstructure vertex, and there is a gap between each of the plurality of reflection units and the microstructure vertex of a corresponding one of the plurality of optical microstructures.

6. The light guide plate according to claim 1, wherein each of the plurality of optical microstructures has an optical surface protruding from or recessed from the first surface, the reflection layer directly contacts the optical surface, and a surface roughness of the reflection layer is greater than a surface roughness of the optical surface.

7. The light guide plate according to claim 1, wherein a percentage value of an orthographic projection area of the absorption layer on the first surface to a surface area of the first surface is less than or equal to 10%.

8. The light guide plate according to claim 1, wherein each of the plurality of optical microstructures has an optical plane facing a light incident surface of the light guide plate, and an angle between the optical plane and a virtual extension surface of the first surface is greater than or equal to 35 degrees and less than or equal to 40 degrees.

9. The light guide plate according to claim 1, wherein each of the plurality of optical microstructures has an optical curved surface recessed from the first surface and a structural edge connected to the first surface, the optical curved surface has a microstructure vertex, an angle between a virtual connection line between the microstructure vertex and any point on the structural edge and a virtual extension surface of the first surface is greater than or equal to 35 degrees and less than or equal to 40 degrees.

10. The light guide plate according to claim 1, wherein each of the plurality of optical microstructures is recessed from the first surface toward an inside of the light guide plate, and there is no gap between each of the plurality of reflection units and an optical surface of a corresponding one of the plurality of optical microstructures.

11. A light source module, the light source module comprising a light guide plate, an absorption layer, a reflection layer, and a light source, wherein:

the light guide plate comprises a plurality of optical microstructures, wherein:

the plurality of optical microstructures are disposed on a first surface of the light guide plate, the reflection layer comprises a plurality of reflection units, and the plurality of reflection units respectively overlap the plurality of optical microstructures, the absorption layer comprises a plurality of first absorption units, the plurality of first absorption units respectively overlap at least a part of the plurality of reflection units, and the at least a part of the plurality of reflection units are located between the corresponding plurality of first absorption units and the plurality of optical microstructures; and the light source is disposed on a side of a light incident surface of the light guide plate, and the light incident surface is connected to the first surface, wherein the absorption layer further comprises a plurality of second absorption units, the plurality of second absorption units do not overlap the plurality of optical microstructures and the plurality of reflection units, the plurality of second absorption units are disposed on the first surface of the light guide plate, and an absorption rate of the plurality of second absorption units is greater than 50%.

12. The light source module according to claim 11, wherein the light source module is configured to be disposed on a side of a display surface of a reflective display panel, the light guide plate also has a second surface facing the display surface, the second surface is opposite to the first surface and connected to the light incident surface, and an absorption rate of the absorption layer for light from a side of the first surface of the light guide plate is greater than 50%.

13. The light source module according to claim 11, wherein a side of the first surface of the light guide plate is configured to dispose an adhesive layer, and the adhesive layer directly covers the absorption layer and the reflection layer.

* * * * *